United States Patent
Nadjafi

[11] Patent Number: 5,498,082
[45] Date of Patent: Mar. 12, 1996

[54] BI-DIRECTIONAL FOIL THRUST BEARING

[75] Inventor: Robert H. Nadjafi, San Pedro, Calif.

[73] Assignee: AlliedSignal Inc., Morris Township, Morris Co., N.J.

[21] Appl. No.: 493,848

[22] Filed: Jun. 20, 1995

[51] Int. Cl.⁶ ................................................. F16C 32/06
[52] U.S. Cl. .......................................................... 384/105
[58] Field of Search ................................. 384/103, 105, 384/106

[56] References Cited

U.S. PATENT DOCUMENTS

| | | | |
|---|---|---|---|
| 4,668,106 | 5/1987 | Gu | 384/105 |
| 4,767,221 | 8/1988 | Paletta et al. | 384/106 X |
| 5,248,205 | 9/1993 | Gu et al. | 384/106 |
| 5,318,366 | 6/1994 | Nadjafi | 384/106 |

Primary Examiner—Thomas R. Hannon
Attorney, Agent, or Firm—John R. Rafter

[57] ABSTRACT

A bi-directional foil thrust bearing for use in a variety of turbomachinery devices and disposed between rotating and stationary members of the turbomachine. The thrust bearing comprises annular bearing stiffener, spring cluster, and follower spring disks, with each disk disposed coaxially about a centerline axis of the device. A plurality of generally trapezoidal foils are attached to the bearing stiffener disk and an equal number of generally trapezoidal spring sets are attached to the spring cluster disk. The bearing stiffener and spring cluster disks are configured to permit a predetermined rotation of the disks relative to one another such that each spring set is aligned with a trailing portion of a corresponding foil, regardless of the direction of rotation of the rotatable member of the device. Accordingly, conformity is provided between the bearing stiffness profile and the film pressure profile developed during the operation of the device. Each spring set includes a central portion attached to the spring cluster disk and a plurality of radially spaced spring members, with each spring member having first and second portions attached to and extending generally circumferentially away from opposing sides of the central portion.

17 Claims, 5 Drawing Sheets 5,498,082

BI-DIRECTIONAL FOIL THRUST BEARING

BACKGROUND OF THE INVENTION

1. Field of the Invention

The present invention relates generally to bearings and, more particularly in order of increasing specificity, to hydrodynamic bearings, compliant bearings, foil bearings, and foil thrust bearings.

2. Related Art

The load capacity of a foil thrust bearing depends on the compliance of the bearing with pressure exerted by a fluid film developed between the bearing and the associated runner, or rotatable member of the device incorporating the bearing. The pressure profile for a thrust bearing varies, and in order to accommodate the optimum pressure profile and attendant fluid film thickness associated with maximum lead capacity, the thrust bearing should be designed to provide stiffness which varies in a manner similar to the pressure profile. Prior foil thrust bearings have been known to exhibit limited lead capacity resulting from the incorporation of springs designed with limited accommodation for the variance in fluid pressure profile and the resultant effect on lead capacity of the bearing. A typical spring utilized in such bearings is illustrated in FIGS. 2–6 of U.S. Pat. No. 4,668,106 issued to Gu. While such spring designs provide varying stiffness in radial directions, they provide limited lead capacity because of excess pad deflection over the spring support points. The excessive pad deflection loads to a divergent fluid film at the trailing edge of the pad and prevents the bearing from developing an optimum pressure profile.

More recent foil thrust bearings, such as those illustrated in U.S. Pat. No. 5,318,366 issued to Nadjafi and U.S. Pat. No. 5,248,205 issued to Gu, et al. incorporate springs which are configured to provide a variation in bearing stiffness in both the radial and circumferential directions. While these thrust bearings solve the aforementioned problems with earlier bearings, they are not suited for use in bi-directional devices, i.e. those in which the runner disposed adjacent the bearing may rotate in either direction. This occurs since, in one direction of rotation, there is a mismatch between the boating stiffness profile and the fluid film pressure profile, causing a deterioration in the conformity of the bearing shape to the rotatable member, or runner.

Accordingly, prior to the present invention, engineer continue to search for improved foil thrust boating designs.

SUMMARY OF THE INVENTION

Accordingly, the present invention is directed to a bi-directional foil thrust bearing for use in an apparatus having a first member rotatable about a centerline axis and a second, stationary member, with the thrust boating disposed between the rotatable and stationary members. According to a preferred embodiment, the bi-directional foil thrust bearing comprises an annular spring cluster disk disposed coaxially about the centerline axis and a plurality of circumferentially spaced, generally trapezoidal spring sots attached to the spring cluster disk. Each of the spring sets includes a radially extending central portion attached to the spring cluster disk and a plurality of radially spaced spring members attached to the central portion. Each of the spring members includes a first portion attached to and extending generally circumferentially away from a first side of the central portion and a second portion attached to and extending generally circumferentially away from an opposite side of the central portion.

BRIEF DESCRIPTION OF THE DRAWINGS

The structural features and functions of the present invention, as well as the advantages derived therefrom, will become apparent from the subsequent detailed description of the preferred embodiments when taken in conjunction with the accompanying drawings in which.

DETAILED DESCRIPTION

Figure 1:
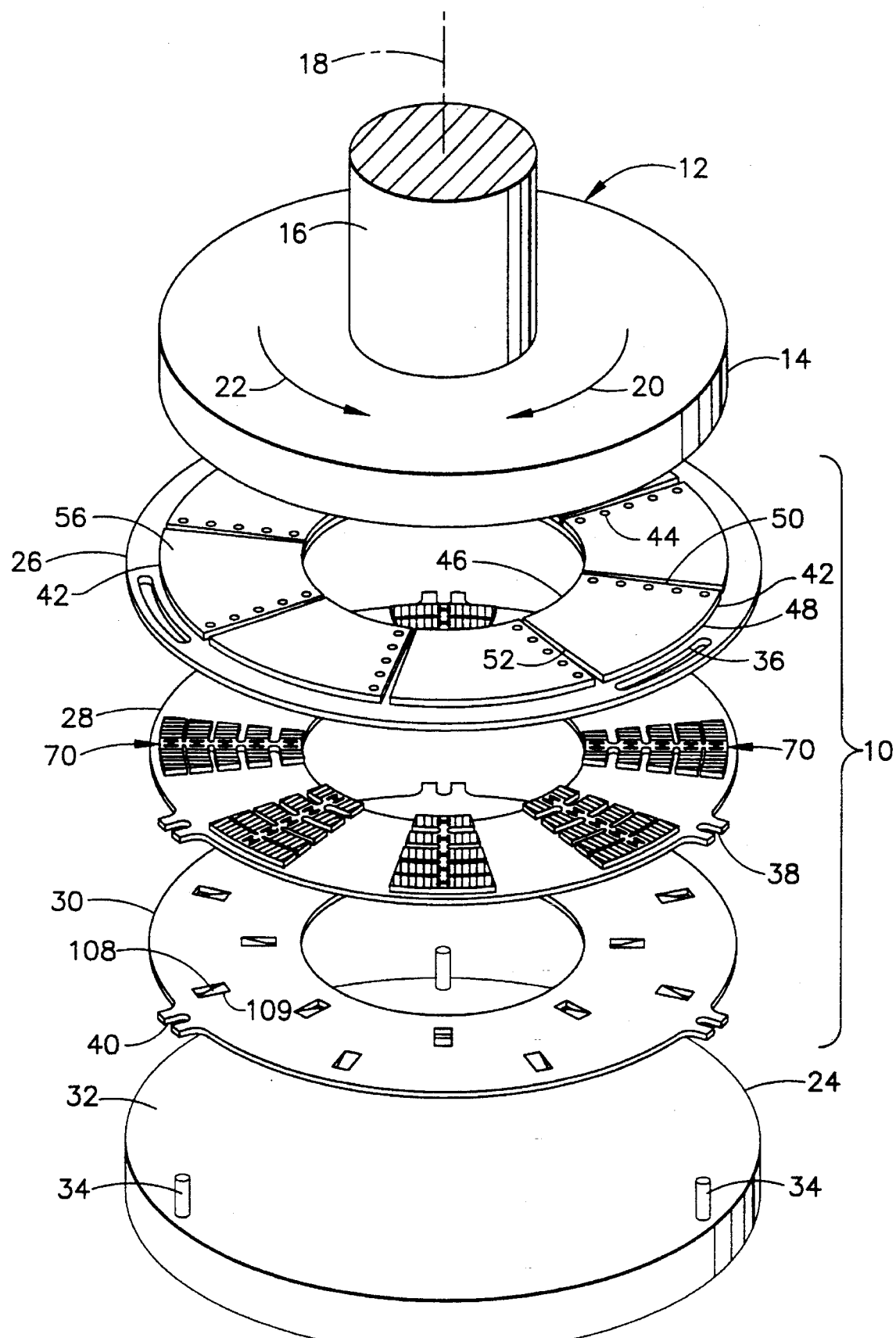
FIG. 1 is an exploded perspective view partially frustrating an apparatus incorporating a bi-directional foil thrust bearing according to the present invention.

Referring now to the drawings, wherein like reference numerals have been used for similar elements throughout, FIG. 1 is an exploded perspective view illustrating a bi-directional foil thrust bearing 10 according to the present invention. Bearing 10 may be used in a variety of turbomachinery devices including, but not limited to, turbocompressors, turbopumps and turboexpanders. One such turbomachine device, or apparatus 12, is partially frustrated in FIG. 1. Apparatus 12 includes a rotatable member, or runner 14 and a shaft 16 attached to runner 14. Both the shaft 16 and runner 14 are rotatable about a longitudinal centerline axis 18, in either a clockwise direction as indicated by arrow 20 in FIG. 1 or in a counterclockwise direction as indicated by arrow 22 in FIG. 1. Apparatus 12 further includes a stationary member, or thrust plate 24, which is longitudinally spaced from runner 14 as shown in FIG. 1. Thrust plate 24 may be a separate unit as illustrated in FIG. 1, but may also form a portion of a housing for bearing 10, or another structural member which is rotationally stationary relative to runner 14. As illustrated in FIG. 1, bearing 10 is disposed, or positioned, longitudinally between runner 14 and thrust plate 24. Due to the subsequently described unique structural features and functions of bearing 10, bearing 10 may be utilized in apparatus 12 when runner 14 is rotated in either clockwise direction 20 or counterclockwise direction 22, unlike prior foil thrust bearings which are only suitable for use in uni-directional devices.

Thrust boating 10 includes an annular bearing stiffener disk 26, a spring cluster disk 28, and a follower spring disk 30. Each of the disks 26, 28 and 30 are coaxially disposed about longitudinal centerline axis 18 and are constructed of a metallic material, preferably from sheet stock. Preferably, disks 26, 28 and 30 are made of stainless steel, a nickel-based alloy such as Inconel X750, 718 or others, or a copper-based alloy such as beryllium copper. However, the particular selection of materials for disks 26, 2g and 30 is dependent upon the particular application and other suitable metals such as iron-based, or aluminum-based alloys may be utilized for particular applications. Thrust plate 24 includes a substantially flat surface 32 which faces toward the spring follower disk 30 so as to provide a proper seating surface for disk 30 of bearing 10. A plurality of alignment pins 34 are attached to, and may be integrally formed with, thrust plate 24. Bearing stiffener disk 26 includes a plurality of circumferentially extending guide slots 36 (only one shown). A minimum of two slots 36 are required, but the particular number of slots may vary with application. Spring cluster disk 28 and follower spring disk 30 each include a plurality of circumferentially spaced notches 38 and 40, respectively, disposed about the periphery of disks 28 and 30, respectively. Guide slots 36 and notches 38 and 40 cooperate with pins 34 to provide the proper clocking, or circumferential alignment of disks 26, 28 and 30 relative to one another as subsequently discussed in greater detail.

Figure 2:
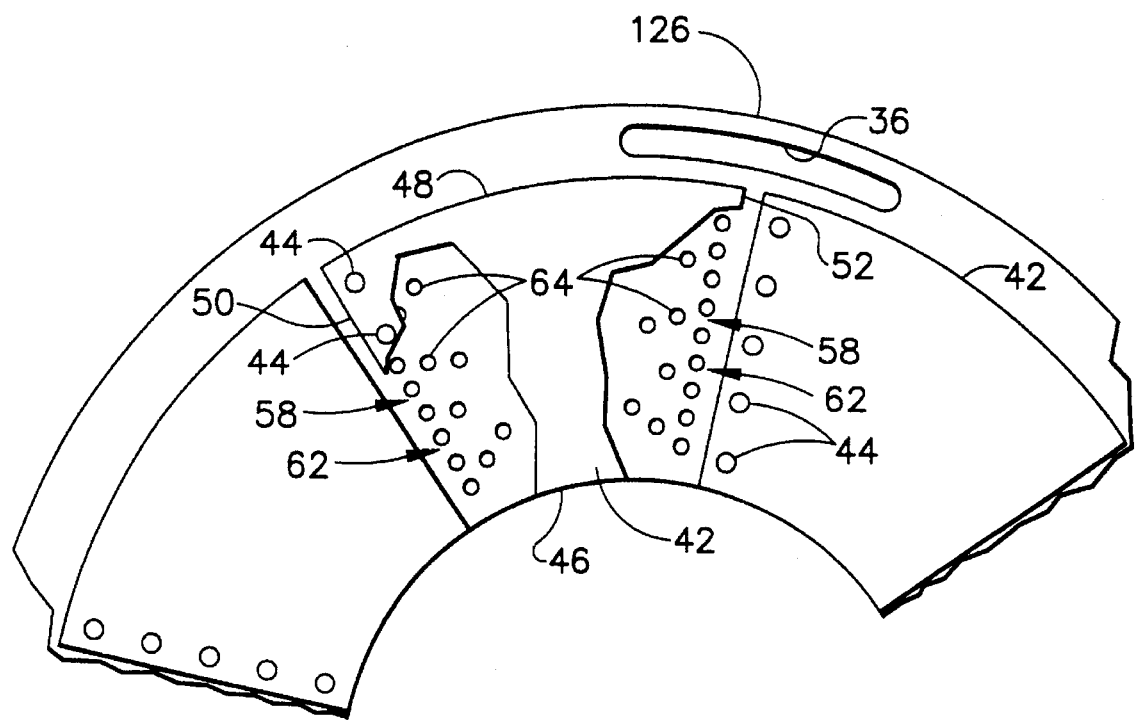
FIG. 2 is a fragmentary plan view illustrating the bearing stiffener disk and associated foils or pads, included in the thrust bearing of the present invention, according to an alternative embodiment.
Figure 3:
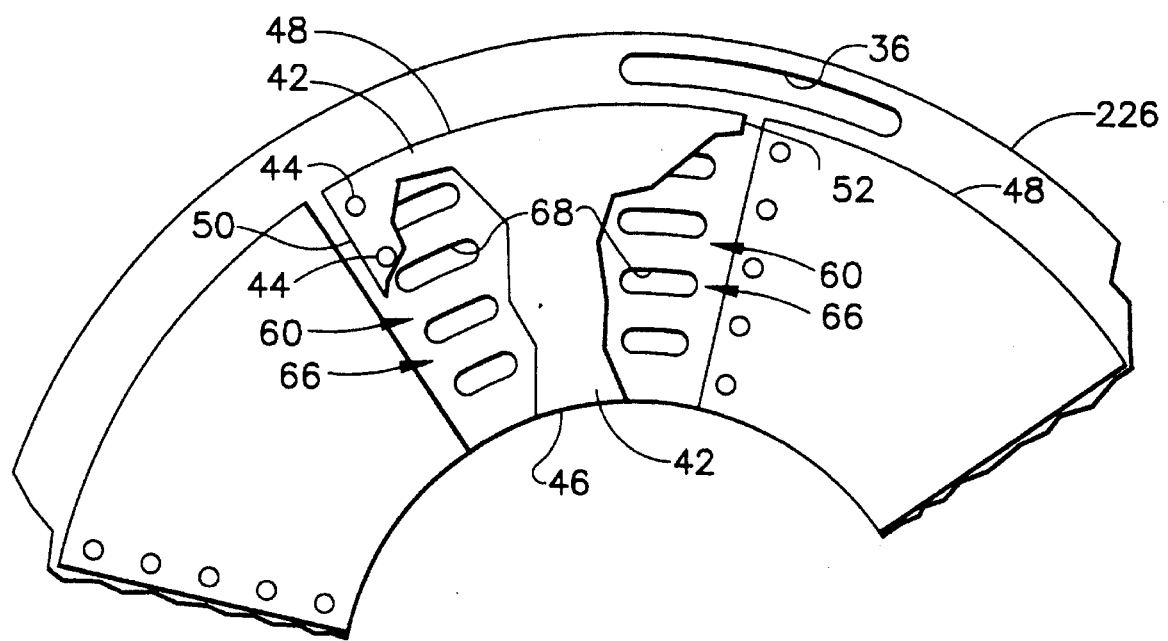
FIG. 3 is a fragmentary plan view frustrating the bearing stiffener disk and associated foils or pads, according to another alternative embodiment.

The bi-directional foil thrust bearing 10 further includes a plurality of circumferentially spaced, generally trapezoidal foils, or pads 42 which are fixedly attached to the bearing stiffener disk 26 by conventional means, such as weldments 44. Alternatively, pads 42 may be fixedly attached to disk 26 by other conventional means. Each foil 42 is bounded by a radially inner arcuate edge 46, a radially outer arcuate edge 48, and opposing radially extending edges 50 and 52. Preferably, the radially extending edges 50 and 52 extend along radial lines. Weldments 44 may be positioned proximate edge 50, as shown in FIG. 1, or alternatively, may be positioned proximate edge 52. When runner 14 rotates in clockwise direction 20, edge 50 comprises the leading edge of foil 42 with edge 52 comprising the trailing edge. However, when runner 14 rotates in counterclockwise direction 22 edges 52 and 50 comprise the leading and trailing edges, respectively, of foil 42. Each foil 42 further includes a slightly convex surface 56 which faces runner 14 and an opposite surface (not shown) which is slightly concave and faces the stiffener disk 26. The desired curvature of surface 56 and the opposite surface varies with application, and depends upon the available starting torque applied to shaft 16 in a given application. The bearing stiffener disk 26 illustrated in FIG. 1 comprises a substantially solid, i.e. devoid of apertures, annular disk. However, thrust bearing 10 may alternatively incorporate a boating stiffener disk 126 as illustrated in FIG. 2, or a bearing stiffener disk 26 as frustrated in FIG. 3, in lieu of the bearing stiffener disk 26. Disks 126 and 226 each incorporate a plurality of sets (two shown for each disk) of apertures, indicated at 58 and 60, respectively, which are utilized to increase the compliance, or to soften, disks 126 and 226, respectively, in selected areas or regions. Each sot 58 of apertures included in disk 126 is disposed within a region 62 of disk 126 which is aligned with one of the foils 42. The number of sets 58 of apertures and therefore the number of regions 62 is equal to twice the number of foils 42, with each set 58 of apertures being biased toward one of the radially extending edges 50 and 52 of one of the foils 42. Each region 62 may be sized such that it is approximately equal to one quarter of the size of foils 42, or somewhat smaller. Each set 58 of apertures comprises a plurality of generally circular holes 64. Each sot 60 of apertures formed through disk 226 is disposed within a region 66 of disk 226 which is aligned with a corresponding one of foils, or pads 42. Similar to the configuration of disk 126, the number of sets 60 of apertures, and therefore the number of regions 66 of disk 226 is twice the number of foils 42, with each set 60 of apertures biased toward one of the radially extending edges 50 and 52 of one of foils 42 as described previously with respect to disk 126. Each region 66 is sized such that it is approximately equal to quarter of the size of foils 42, or may be sized to be somewhat smaller. Each set 60 of apertures comprises a plurality of circumferentially extending, and radially spaced slots 68. As with disk 26, foils 42 are attached to disks 126 and 226 via conventional means, such as weldments 44 which are radially spaced and disposed proximate edge 50 or 52 of each pad 42. Sets 58 and sets 60 are biased toward edges 50 and 52 of foils 42 since, as subsequently discussed in greater detail, the film pressure existing over the leading portion of foils 42 is relatively low, thereby requiring a relatively low stiffness of bearing 10 in these areas, and since either edge 50 or edge 52 of each foil 42 may comprise a loading edge of the corresponding foil 42 due to the bi-directional capability of shaft 16 and runner 14.

Figure 4:
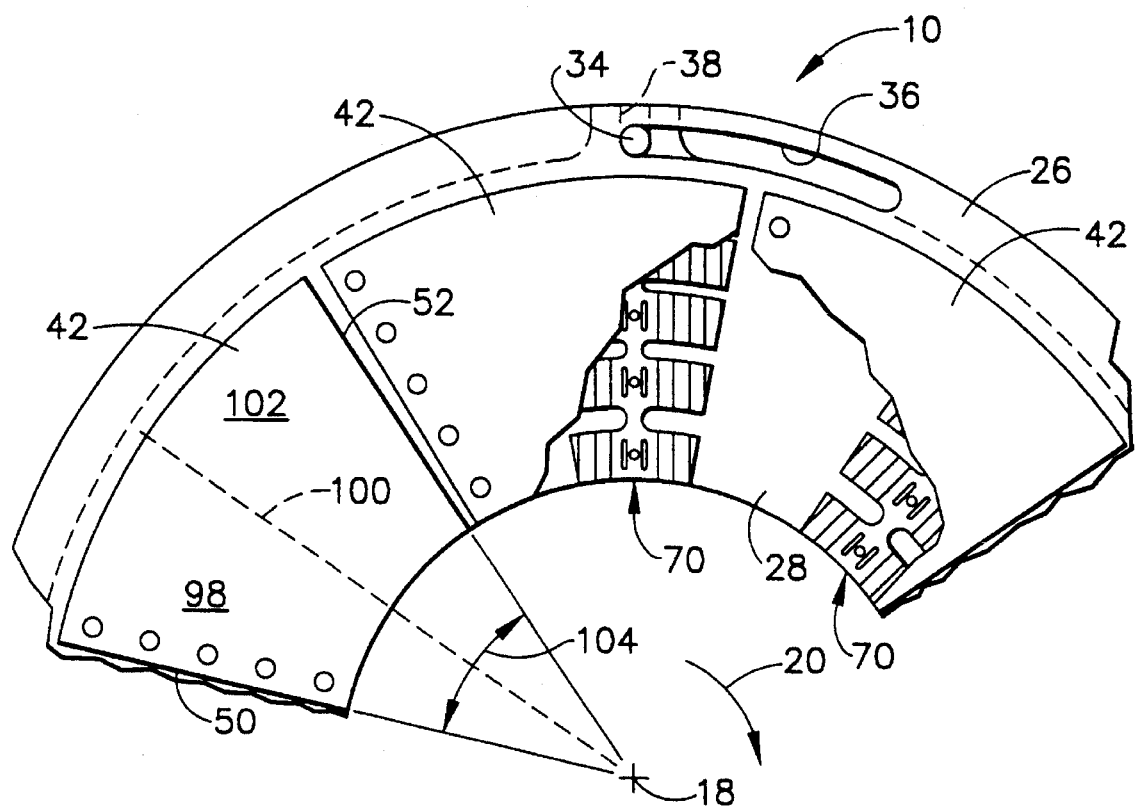
FIG. 4 is a fragmentary plan view further illustrating the bearing stiffener disk and spring cluster disk shown in FIG. 1.
Figure 5:
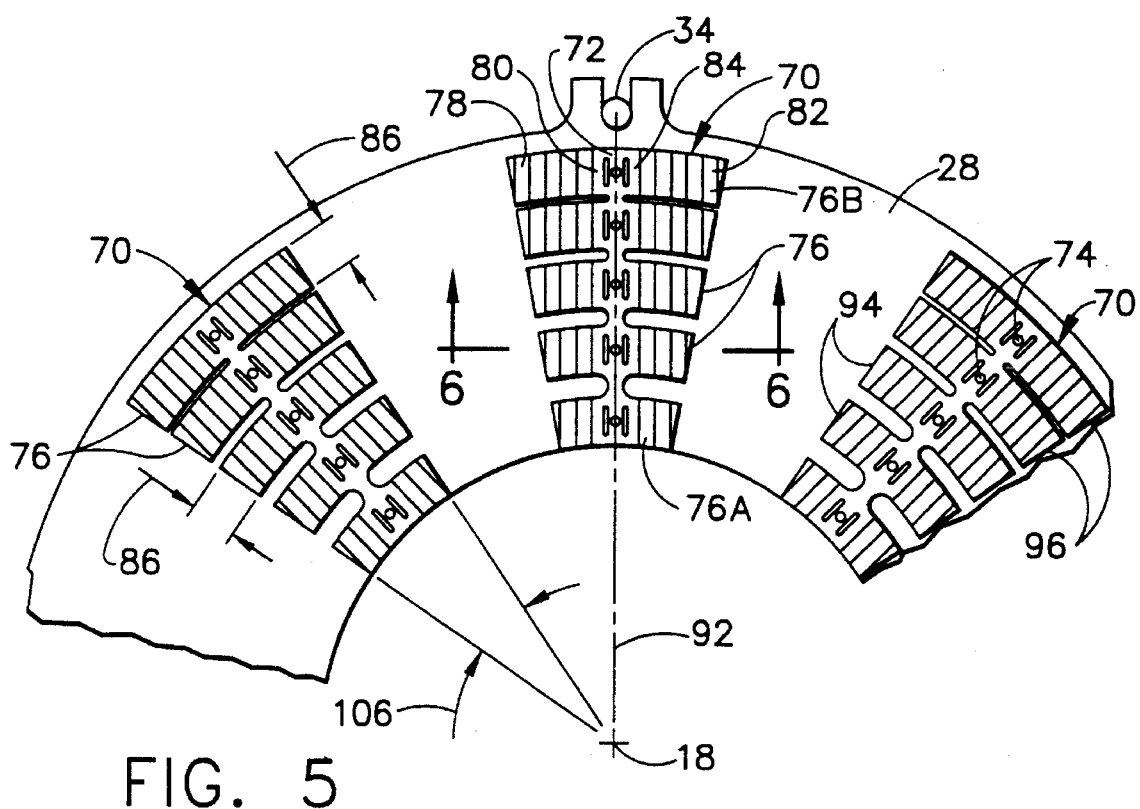
FIG. 5 is a fragmentary plan view further illustrating the spring cluster disk and associated spring sets shown in FIG. 1.
Figure 6:
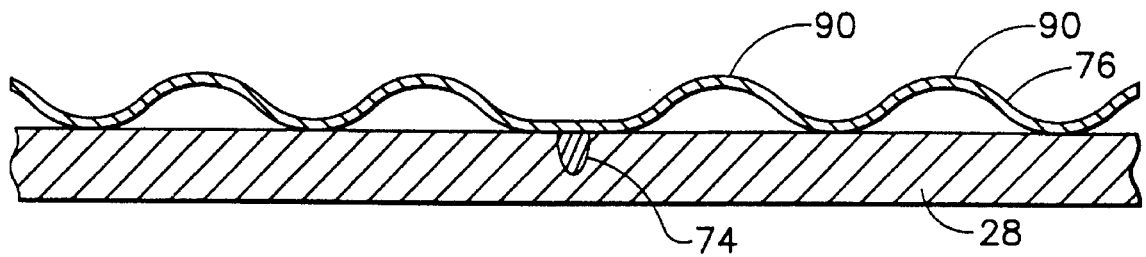
FIG. 6 is a cross-sectional view taken along line 6–6 in FIG. 5.
Figure 7:
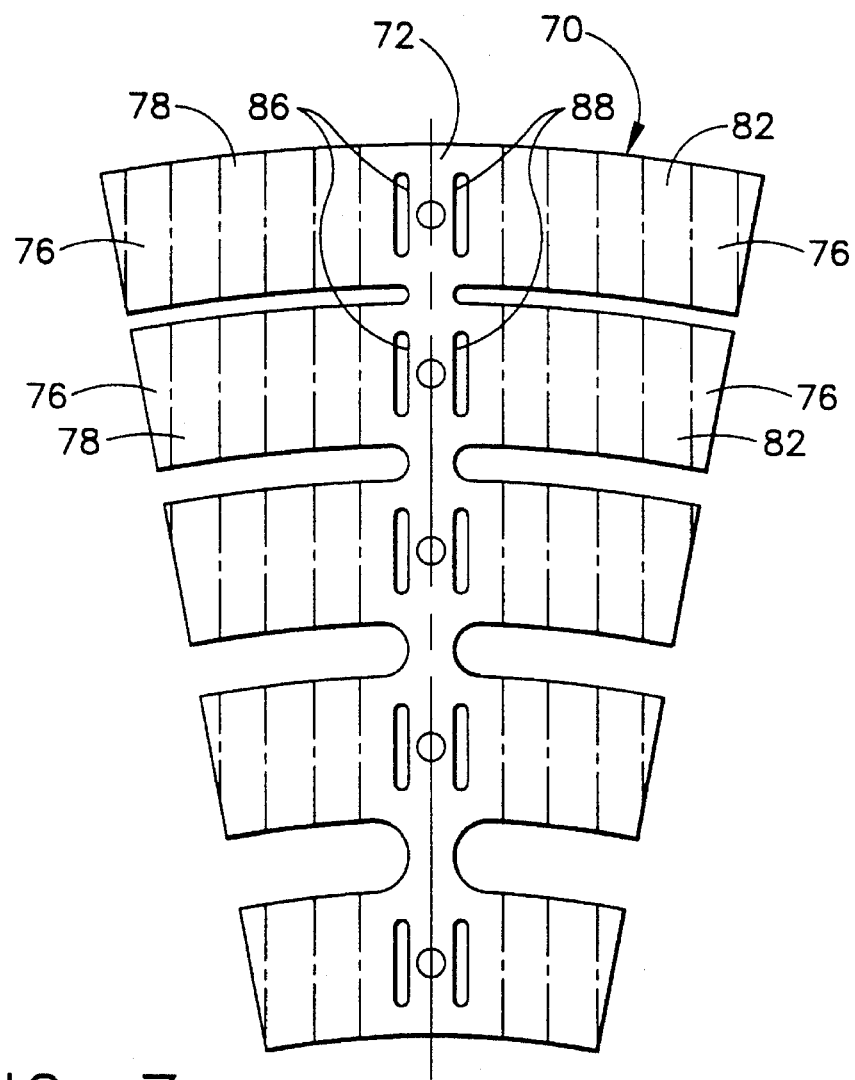
FIG. 7 is a plan view further frustrating one of the spring sets shown in FIG. 5.

Referring now to FIGS. 4–7, the foil thrust bearing 10 further comprises a plurality of circumferentially spaced, generally trapezoidal spring sets indicated generally at 70. Each of the spring sets 70 is attached to the spring cluster disk 28, and the total number of spring sets 70 is equal to the number of foils 42 attached to the stiffener disk 26. Each spring sets 70 includes a radially extending central portion 72 which is attached to spring cluster disk 28 via conventional means such as radially spaced weldments 74. Each spring set 70 further includes a plurality of radially spaced spring members 76. Each spring member 76 includes a first portion 78 attached to and extending generally circumferentially away from a first side 80 of central portion 72, and a second portion 82 which is attached to and extends generally circumferentially away from a second side 84 of central portion 72. Portions 78 and 82, for each spring member 76, are mirror images of one another. Each spring member 76 includes a radial width 86 and spring members 76 are sized such that the radial widths 86 progressively increase in magnitude from a radially innermost one of spring members 76, indicated as 76A in FIG. 5, to a radially outermost one of spring members 76, indicated as 76B in FIG. 5. Accordingly, spring members 76 provide a variation in stiffness of bearing 10 in a radial direction. A total of five spring members 76 is illustrated in each spring set 70. However, other numbers of spring members 76 may be used. It is preferable to provide as many spring members 76 in each spring set 70 as is possible in view of dimensional constraints and manufacturing costs to provide a relatively smooth stiffness gradient of beating 10. It should be noted that, unlike some prior spring designs, the thickness 86 for any given spring member 76, is substantially constant in a circumferentially extending direction. Each spring set 70 may optionally include a first set of radially aligned and radially extending slots 86, and a second set of radially aligned and radially extending slots 88. Each of the slots 86 is formed in the central portion 72 of the corresponding spring set 70 and is disposed proximate the first portion 78 of the corresponding spring member 76. Each of the slots 88 is formed in the central portion 72 of the corresponding spring set 70 and is disposed proximate the second portion 82 of the corresponding spring member 76. Slots 86 and 88 are not included in spring set 70 for purposes of stiffness variation, but rather are included to ensure that the first and second portions 78 and 82, respectively, of each spring members 76 are free to move independently of the central portion 72 of spring set 70. Each of the spring members 76 comprises a corrugated spring as shown in FIG. 6. The only portion of spring set 70 which is fixedly attached to the spring cluster disk 28 is central portion 72, thereby permitting spring members 76 to deflect relative to the spring cluster disk 28. Spring sets 70 are preferably manufactured separately and apart from disk 28 and subsequently attached to disk 28 as discussed previously. Alternatively, spring sets 70 may be integrally formed from a relatively thicker spring cluster disk. In this instance, the two dimensional shape of each spring cluster disk, best seen in FIGS. 5 and 7, may be created by chemical etching of the spring cluster disk 28. Each spring member 76 may then be stamped in a forming die to form the wavy cross-section or corrugations of spring member 76. The corrugations produce a plurality of crests, or peaks 90 for each spring member 76, as best seen in FIG. 6. The crests 90 of adjacent spring members 76 may be aligned in a direction parallel to a centerline axis 92 of spring set 70, or alternatively, may be aligned in a direction parallel to a radial line passing through a distal end 94 of the first portions 78 of spring members 76 or a radial line passing through a distal end 96 of the second portions 82 of spring members 76. If thrust bearing 10 is configured to include either of the alternative bearing stiffener disks 126 or 226 in lieu of disk 26, thrust bearing 10 may optionally include a relatively thin, flat, solid annular disk (not shown) coaxially disposed about axis 18 and positioned longitudinally between disk 126 or disk 226 and disk 28. The purpose of this optional thin, flat, solid disk is to prevent the crests 90 of spring members 76 from becoming engaged with or caught in either holes 64 of disk 126 or slots 68 of disk 226. The necessity for including the optional thin, flat, solid disk depends on the size of holes 64 or slots 68, which is dependent upon the particular application of bearing 10.

FIG. 4 illustrates the orientation, or alignment between the bearing stiffener disk 26 and the spring cluster disk 28, which exists in a circumferential direction. Each foil 42 may be subdivided into a first region or portion 98 extending from the radially extending edge 50 to a median line 100, and a second region or portion 102 extending from the median line 100 to the radially extending edge 52. Portions 98 and 102 comprise either a leading or trailing portion of foil 42, depending upon the direction of rotation of runner 14. When runner 14 rotates in clockwise direction 20, portion 98 comprises the leading portion of foil 42, while portion 102 comprises the trailing portion of foil 42. When runner 14 rotates in counterclockwise direction 22, regions 102 and 98 comprise the loading and trailing portions, respectively, of foil 42. During rotation of runner 14, the pressure profile of the fluid film passing over foils 42 increases in a circumferential direction. Accordingly, it is desirable to align the spring sets 70 with the trailing portion of the foils 42. This circumferential alignment is illustrated in FIG. 4 which corresponds to the alignment achieved during the clockwise direction of rotation 20 of runner 14, and is achieve, d by the unique features of thrust bearing 10. As shown in FIG. 4, each spring set 70 is aligned with region or portion 102 of the corresponding one of foils 42, with portion 102 comprising the trailing portion of foil 42 during rotation of runner 14 in clockwise direction 20. As shown in FIG. 4, each foil 42 subtends an angle 104 and, as shown in FIG. 5, each spring set 70 subtends an angle 106. Angle 106 is less than angle 104 and preferably the magnitude of angle 106 is one half of the magnitude of angle 104. Consequently, each spring set 70 is sized to correspond to one half of the size of foils 42 and is therefore equivalent in size to either portion 98 or 102. The desired alignment between disks 26 and 28 which is illustrated in FIG. 4, is achieved by the cooperation among pins 34, notches 38 in disk 28 and slots 36 in disk 26. Each of the pins 34, which protrude from the thrust plate 24, is received in one of the notches 40 formed in the spring follower disk 30, one of the notches 38 formed in spring cluster disk 28, and one of the slots 36 formed in the bearing stiffener disk 26, thereby providing alignment among disks 26, 28 and 30. When runner 14 rotates in clockwise direction 20, disks 26 and 28 rotate relative to each other, by a predetermined amount defined by the circumferential extent of slot 36, until pins 34 bottom out, or contact a circumferential end of slot 36 as illustrated in FIG. 4. It should be understood that when runner 14 rotates in the opposite, counterclockwise direction 22, the pins 34 bottom out in the opposite circumferential end of slots 36. The relative rotation between disks 26 and 28 during the initial, or startup rotation of shaft 16 is caused by the frictional force between the runner 14 and foils 42. After pins 34 contact one of the ends of slots 36, disks 26 and 28 do not rotate relative to one another until the direction of rotation of runner 14 is reversed.

In order to provide an acceptable service life, the bearing stiffener disks 26, 126, or 226, or at least portions of oath disk surrounding guide slots 36, must be hardened by conventional means such as carborizing, nitriding, or the application of a hard coating. Additionally, the interface between beating disk 26, 126, or 226 and tho spring cluster disk 28 may be coated with a durable and low friction coating to allow relatively smooth relative rotation of either disk 26, 126, or 226 relative to disk 28 during reversal of tho direction of rotation of shaft 16. Surfaces 56 of foils 42 may be coated with a solid lubricant such as Teflon® (Teflon is a registered trademark of the E. I. Dupont De Nemours & Company), molydisulfide or polyimide to further enhance the service life of beating 10.

Figure 8:
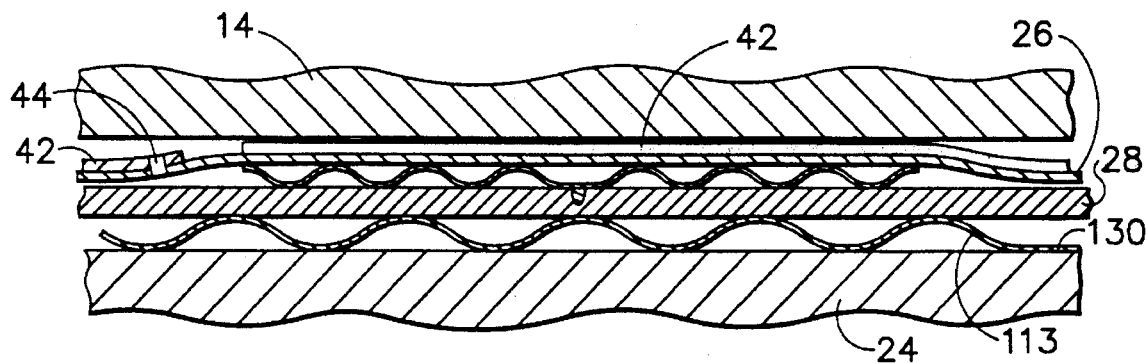
FIG. 8 is a cross-sectional view frustrating the foil thrust bearing of the present invention incorporating a follower spring according to an alternative embodiment.

Referring now to FIG. 1, the spring follower disk 30 includes a plurality of generally U-shaped tabs 108 which are formed by cutting a corresponding number of generally U-shaped slots 109 in disk 30 and bending the resulting tabs 108 away from disk 30 and toward the thrust plate 24 to form a plurality of spaced apart preload springs. Alternatively, tabs 108 and slots 109 may be included in the spring cluster disk 28, at locations spaced from spring sets 70, thereby eliminating the need for disk 30. As yet another alternative, thrust bearing 10 may incorporate a spring follower disk 130, which is partially illustrated in the cross-sectional view shown in FIG. 8, with disk 130 including a plurality of circumferentially spaced and generally circumferentially exuding corrugated preload springs 113 (only one shown in FIG. 8). FIG. 8 frustrates bearing 10 in a loaded condition which occurs during the operation of apparatus 12. Although the corrugations of the spring 113 are shown in FIG. 8 for purposes of illustration, the corrugations of each spring 113 are substantially flattened during the operation of apparatus 12. Each corrugation of spring 113 converges in a radially inward direction toward tho center of disk 130 and may be formed by stamping disk 130 in a forming die. Each preload spring 113 may comprise a single corrugated spring member or alternatively may comprise a plurality of radially spaced corrugated spring members. Regardless of whether bearing 10 includes tabs 108, incorporated in either disk 30 or disk 28, or corrugated springs 113 included in disk 130, the total preload spring force exerted by either tabs 108 or springs 113 is substantially less than the spring force exerted by spring members 76 of spring sets 70.

In operation, the thrust bearing 10 is initially biased longitudinally into contact with the rotatable member, or runner 14 due to the engagement of either disk 30 or 130 with thrust plate 24 and the resultant spring force exerted by tabs 108 or corrugated springs 113. During operation of apparatus 12, the runner 14 may rotate in either the clockwise direction 20 or the counterclockwise direction 22. Regardless of the direction of rotation, a hydrodynamic film develops between foils 42 and the runner 14, causing the bearing stiffener disk 26 and the spring cluster disk 28 to rotate slightly relative to one another so as to align the spring sets 70 with the trailing portion of the corresponding foils 42. The fluid pressure associated with the development of the film overcomes the opposing preload spring force associated with either tabs 108 or corrugated springs 113, and the bearing 10 moves toward the thrust plate 24 until the tabs 108 or springs 113 are flattened relative to the remainder of disks 30 or 130, respectively.

Figure 9:
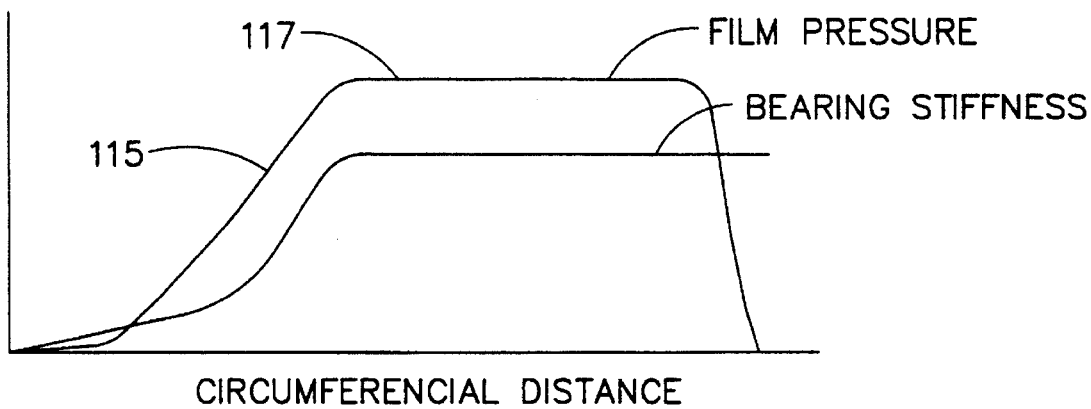
FIG. 9 is a graphic representation frustrating the relationship between circumferential distance along a bearing foil and both pressure of the fluid film over the boating foil and stiffness of the thrust boating.
Figure 10:
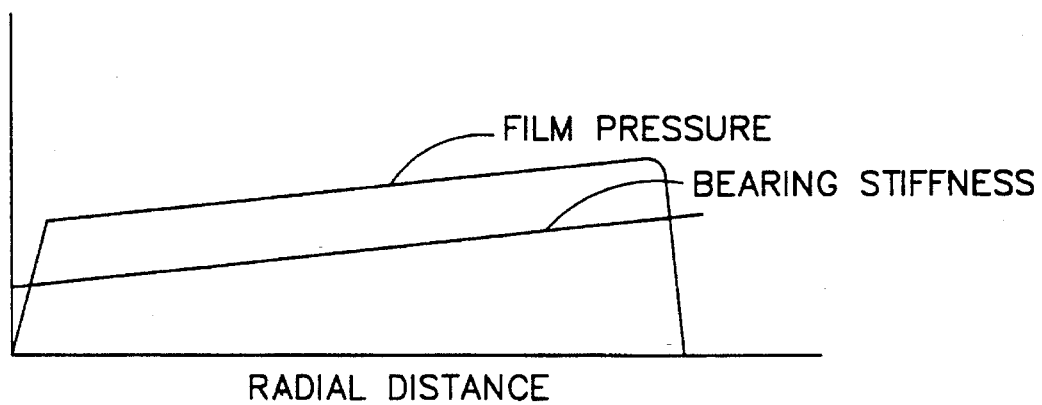
FIG. 10 is a graphic representation illustrating the relationship between radial distance along a boating foil and both the fluid film pressure over the foil and the stiffness of the thrust bearing.

FIG. 9 generally frustrates the pressure profile of the film existing over each of the foils 42 versus the circumferential distance from the leading edge to the trailing edge of the foil 42, and a corresponding stiffness profile of bearing 10 which is required to achieve an optimum load capacity of bearing 10. FIG. 10 generally illustrates the pressure gradient and required stiffness of bearing 10 from the radially inner edge to the radially outer edge of each foil 42 at any given circumferential location on the trailing portion of foil 42. The film pressure existing over the leading portion of foils 42 is relatively low, and accordingly the required stiffness gradient of bearing 10 in a radial direction in the leading portion of foils 42 is negligible. As shown in FIG. 9, the film pressure profile includes a first range 115 which gradually increases throughout the leading portion of each foil 42 and a second range of 117 which is substantially constant throughout the trailing portion of each foil 42. The required bearing stiffness illustrated in FIG. 9 is substantially achieved by spring sets 70 which are aligned with the trailing portions of the corresponding foils 42 and since the leading portion of foils 42 are substantially unsupported. The bearing stiffness required in the leading portion may be further reduced by the use of bearing stiffener disk 126 incorporating the plurality of generally circular holes 64 or the use of bearing stiffener disk 226 incorporating the plurality of slots 68, in lieu of stiffener disk 26 which is devoid of any apertures. The required bearing stiffness variation in a radial direction, illustrated in FIG. 10, is approximated by the use of spring sets 70 which comprise a plurality of spring members 76 having widths which progressively increase from an innermost one 76A of the spring members 76 to an outermost one 76B of the spring members 76. Although the use of spring members 76 approximates the required bearing stiffness in a step-wise fashion, the provision of a smoother stiffness gradient in a radial direction, which more closely approximates the desired bearing stiffness illustrated in FIG. 10, is considered within the scope of the present invention, and is limited only by the cost one is willing to incur for analysis and manufacture.

While the foregoing-description has set forth the preferred embodiments of the invention in particular detail, it must be understood that numerous modifications, substitutions and changes can be undertaken without departing from the true spirit and scope of the present invention as defined by the ensuing claims. The invention is therefore not limited to specific preferred embodiments as described, but is only limited as defined by the following claims.

What is claimed is:

1. A bi-directional foil thrust bearing for use in an apparatus having a first member rotatable about a centerline axis and a second, stationary member, said thrust bearing disposed between said rotatable and said stationary members, said bi-directional foil thrust bearing comprising:

an annular spring cluster disk disposed coaxially about the centerline axis;

a plurality of circumferentially spaced, generally trapezoidal spring sets attached to said spring cluster disk;

wherein each of said spring sets includes a radially extending central portion attached to said spring cluster disk and a plurality of radially spaced spring members attached to said central portion; and wherein each of said spring members includes a first portion attached to and extending generally circumferentially away from a first side of said central portion and further includes a second portion attached to and extending generally circumferentially away from an opposite side of said central portion.

2. The foil thrust bearing as recited in claim 1, wherein:

each of said spring member includes a radial width;

said spring members are sized such that said radial widths progressively increase in magnitude from a radially innermost one of said spring members to a radially outermost one of said spring members.

3. The foil thrust bearing as recited in claim 2, wherein said first portion of each of said spring members is a mirror image of said second portion of a corresponding one of said spring members.

4. The foil thrust bearing as recited in claim 2, wherein:

each of said spring sets includes first and second sets of radially aligned and radially extending slots;

each said slot of said first set of slots is formed in said central portion proximate one of said first and second portions of one of said spring members;

each said slot of said second set of slots is formed in said central portion proximate the other of said first and second portions of said one of said spring members.

5. The foil thrust bearing as recited in claim 1, wherein each of said spring members is corrugated.

6. The foil thrust bearing as recited in claim 1, further comprising:

an annular bearing stiffener disk coaxially disposed about the centerline axis and positioned longitudinally between said spring cluster disk and the rotatable member;

a plurality of circumferentially spaced, generally trapezoidal foils attached to said bearing stiffener disk, wherein the number of said foils is equal to the number of said spring sets;

wherein said stiffener disk and said spring cluster disk are configured such that each of said spring sets are aligned with a trailing portion of a corresponding one of said foils during rotation of the rotatable member.

7. The foil thrust bearing as recited in claim 6, wherein:

each of said spring sets subtends a first angle;

each of said foils subtends a second angle;

said first angle is less than said second angle.

8. The foil thrust bearing as recited in claim 7, wherein the magnitude of said first angle is one half of the magnitude of said second angle.

9. The foil thrust bearing as recited in claim 6, wherein:

said stiffener disk includes a plurality of circumferentially spaced and circumferentially extending guide slots;

said spring cluster disk includes a plurality of circumferentially spaced notches;

each one of at least a portion of said guide slots and said notches receives one of a plurality of pins attached to and protruding longitudinally from the stationary member toward the rotatable member;

said guide slots and said notches cooperate with said pins so as to align each of said spring sets with said trailing portion of a corresponding one of said foils during rotation of the rotatable member.

10. The foil thrust bearing as recited in claim 9, further comprising:

a follower spring disk disposed coaxially about the centerline axis and positioned longitudinally between said spring cluster disk and the stationary member;

a plurality of spaced preload springs formed in and attached to said follower spring disk.

11. The foil thrust bearing as recited in claim 10, wherein said plurality of preload springs comprises a plurality of generally U-shaped tabs.

12. The foil thrust bearing as recited in claim 10, wherein said plurality of preload springs comprises a plurality of corrugated springs.

13. The foil thrust bearing as recited in claim 9, wherein: said bearing stiffener disk includes a plurality of sets of apertures formed through said disk;

each of said sets of apertures is disposed within a region of said disk which is aligned with one of said foils.

14. The foil thrust bearing as recited in claim 13, wherein each of said sets of apertures comprises a plurality of generally circular holes.

15. The foil thrust bearing as recited in claim 13, where each of said sets of apertures comprises a plurality of circumferentially extending slots.

16. The foil thrust bearing as recited in claim 13, wherein each of said set of apertures is biased toward a radially extending edge of one of said foils.

17. The foil thrust bearing as recited in claim 16, wherein the number of said sets of apertures is twice the number of said foils.

* * * * *

UNITED STATES PATENT AND TRADEMARK OFFICE
CERTIFICATE OF CORRECTION

PATENT NO. : 5,498,082
DATED : March 12, 1996
INVENTOR(S) : Robert H. Nadjafi

It is certified that error appears in the above-indentified patent and that said Letters Patent is hereby corrected as shown below:

| | | |
|---|---|---|
| Col. 1, | lines 18, 22, 24 and 28: | change "lead" to "load" |
| | line 30: | change "loads to " to "leads to" |
| | lines 43 and 47: | change "boating" to "bearing" |
| | line 46: | change "engineer" to "engineers" |
| | line 60: | change "sots" to "sets" |
| Col. 2, | lines 11, 18, 30, 32 and 35: | change "frustrating" to "illustrating" |
| | lines 37, 38, and 40: | change "boating" to "bearing" |
| | line 53: | change "frustrated" to "illustrated" |
| Col. 3, | line 6: | change "boating" to "bearing" |
| | line 14: | change "2g" to "28" |
| | line 58: | change "boating" to " bearing" |
| | line 59: | change "26" to " 226" |
| | line 60: | change "frustrated" to "illustrated" |
| | line 65: | change "sot" to "set" |
| Col. 4, | line 7: | change "sot" to "set" |
| | line 60: | change "beating" to " bearing" |
| Col. 5, | line 57: | change "loading" to " leading" |
| Col. 6, | line 32: | change "oath" to " each" |
| | line 36: | change "beating" to " bearing" |
| | lineS 39 and 65: | change "tho" to " the" |
| | line 59: | change "frustrates" to "illustrates" |
| Col. 7, | line 2, 17, 30 and 37: | change "beating" to " bearing" |
| | line 26: | change "frustrates" to "illustrates" |

Signed and Sealed this

Eighth Day of October, 1996

Attest:

BRUCE LEHMAN

Attesting Officer

Commissioner of Patents and Trademarks